Nov. 13, 1962   J. D. BENFIELD ETAL   3,063,314
PIPE AND TUBING BENDER
Filed July 18, 1960
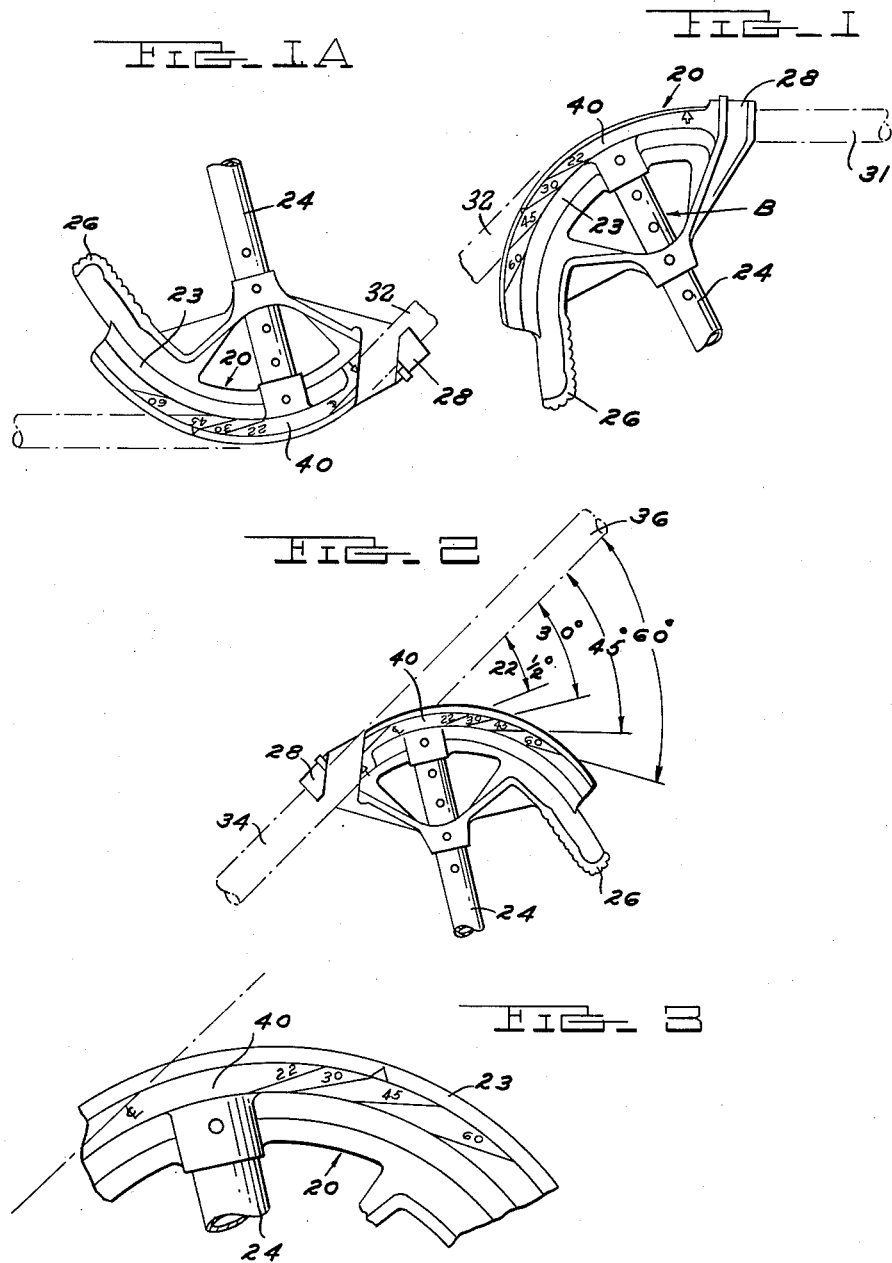
INVENTORS
JOHN D. BENFIELD
RICHARD R. KOZINSKI
BY
Barnes, Kisselle, Raisch & Choate
ATTORNEYS

3,063,314
PIPE AND TUBING BENDER
John D. Benfield, 415 Brainard, Detroit 1, Mich., and Richard R. Kozinski, 3316 27th St., Canton, Ohio
Filed July 18, 1960, Ser. No. 43,636
2 Claims. (Cl. 81—15)

This invention relates to a pipe and tubing bender and more particularly to that type of bender, which is shown in United States patent to Benfield, No. 2,584,537, issued February 5, 1952.

The particular improvement of the present invention relates to the marking of certain angles on both faces of a pipe and tubing bender to facilitate the creation of the exact degree of bend required as the operator fabricates the tubing or pipe on the job.

Unless a worker is extremely experienced and skilled, he has found it difficult to achieve the exact degree of bend required for accurate pipe offsets. Offsets are necessary to carry pipe or conduit over and under certain obstructions on the job. Each bend of an offset, to look workmanlike and to be accurate in depth, should be identical with its mate in degree of bend.

The present invention involves a tube or pipe bender having side faces scored with gradient marks which visually instruct the operator where to stop his bend for any particular angle he desires. The marks are so arranged that the operator need only align the near wall of the pipe with the selected line and the proper result is obtained. The marks also facilitate rapid fabrication of repeat matching bends of identical contour.

Other objects and features of the invention relating to details of construction and operation will be apparent in the following description and claims.

Drawings accompany the disclosure and the various views thereof may be briefly described as:

FIGURE 1, a view illustrating one face of the tool and showing the manner in which a 45 degree angle is put into a pipe with the tool upright in the air.

FIGURE 1A, a view illustrating the other face of the tool showing the manner in which a second bend could be applied to the pipe of FIGURE 1 with the tool on the floor. Both bends could be made with the tool upright or with the tool on the floor.

FIGURE 2, an illustration showing the manner in which a piece of pipe or conduit is placed in a pipe bender tool when the conduit to be bent is used as a lever, the tool remaining stationary or upright in the air with the pipe bender handle resting on the floor.

FIGURE 3, an enlarged view showing the several commonly used angles of bend on the pipe bender tool. These degree marks could vary in a range from zero to ninety degrees.

As shown in the drawings, a pipe bender body 20 is illustrated having an arcuate shoe 23 with a handle portion 24 and a facilitating foot pressure pedal 26. The handle is socketed in a handle well radially disposed relative to the arcuate shoe. The hook portion for the pipe to be bent is shown at 28. The shoe has a groove to receive the pipe. In the relatively smooth outer faces of the pipe bender on the arcuate shoe portion 23 which is composed of two arcuate flanges which form the groove, there are cast four lines marked respectively with degree indicia 22, 30, 45 and 60. The 22° line is in reality a 22½° bend. The fraction has been deleted to permit larger characters and better legibility. These lines are preferably cast into each side of the arcuate shoe portion 23 of the pipe bender as grooves or ridges with adjacent indicia so that the operator can view them from either side in bending a pipe such as shown in FIGURES 1 and 1A where two bends, which together comprise an offset, are each fabricated to a 45° angle. In FIGURES 1 and 1A note that both faces of the tool are illustrated.

It will be seen that the 45° line on the tool aligns physically with the near wall of the pipe when a 45° bend has been attained. In other words, if the pipe section 36 at the right of FIGURE 2 is bent down to the place where the line 45 registers with the underside of the pipe section 36, the pipe has been bent to a 45° angle. Spring back can be compensated for by overbending slightly so that when bending pressure is relaxed the pipe settles back and levels off with the desired degree mark. Each pair of marking lines, that is, the pair for each degree indicia is disposed in a plane lying perpendicular to the plane of the bender and at an angle to the axis of the threaded handle socket, the angles becoming progressively more acute as the angle of bend increases. The pipe in profile is aligned from either side with the proper line on the face of the shoe.

As shown in FIGURE 2, the length of pipe 36 is ready to be bent at an angle to the portion 34 at any point varying from 22½° which is the first mark, to 60° which is the final mark. Any degree range or combination of degree marks from 1° to 90° could be applied to the tool but 22½°, 30°, 45° and 60° marks have been chosen because these angles are those most commonly used by tradesmen in the field. These degree marks all generally point toward the base of the handle well 40.

With the use of a device of this kind, electrical conduit, tubing or water pipe can be readily and accurately formed through a constructed building so that they can pass over beams and intercross in a neat workmanlike manner.

With the simple indicia on both sides of the bender, it is possible to provide easy-to-follow instructions to workmen and provide them with offset formulas and shrink tables for the mathematical fabrication of precision offsets and pipe saddle bends.

We claim:

1. In a pipe bender of the type having an arcuate shoe with side flanges separated by a pipe groove, a handle well radially of the shoe, and a pipe hook at one end of said groove, an arcuate face surface at the edge of each side flange paralleling the flange, and a plurality of spaced lineal markings on said face surfaces arranged in pairs and each pair pointing inwardly generally toward the end of the handle well and extending outwardly substantially to the edge of the shoe, each pair lying in a common plane perpendicular to the general plane of the bender and at a predetermined angle to the axis of the pipe hook along lines intersecting at a common focal point such that the lines may be physically aligned from either side with the pipe profile in a bending action.

2. In a pipe bender of the type having an arcuate shoe with side flanges separated by a pipe groove, a handle well radially of the shoe, and a pipe hook at one end of said groove, an arcuate face surface at the edge of one side flange paralleling the flange, and a plurality of spaced lineal markings on said face surface pointing inwardly generally toward the end of the handle well and extending outwardly substantially to the edge of the shoe, each said lineal marking being at a predetermined angle to the axis of the pipe hook, said lineal markings extending along lines intersecting at a common focal point such that the lines may be physically aligned from the side with the pipe profile in a bending action.

References Cited in the file of this patent

UNITED STATES PATENTS

| | | |
|---|---|---|
| 727,421 | Haight | May 5, 1903 |
| 968,106 | Zimmermann | Aug. 23, 1910 |
| 2,817,986 | Benfield | Dec. 31, 1957 |
| 2,847,705 | Hellwig | Aug. 19, 1958 |
| 2,887,917 | Kowal | May 26, 1959 |
| 2,953,048 | Brown | Sept. 20, 1960 |
| 2,955,495 | Stirling | Oct. 11, 1960 |